US012649304B2

(12) United States Patent
Ye et al.

(10) Patent No.: US 12,649,304 B2
(45) Date of Patent: Jun. 9, 2026

(54) BIREFRINGENT POLYMER HAVING BIMODAL MOLECULAR WEIGHT

(71) Applicant: Meta Platforms Technologies, LLC, Menlo Park, CA (US)

(72) Inventors: Sheng Ye, Redmond, WA (US); Andrew John Ouderkirk, Kirkland, WA (US); Li Yao, Bothell, WA (US); Lafe Joseph Purvis, II, Redmond, WA (US); Arman Boromand, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 441 days.

(21) Appl. No.: 18/179,927

(22) Filed: Mar. 7, 2023

(65) Prior Publication Data

US 2023/0234345 A1      Jul. 27, 2023

Related U.S. Application Data

(63) Continuation of application No. 17/514,298, filed on Oct. 29, 2021, now Pat. No. 11,628,656.

(Continued)

(51) Int. Cl.
B32B 27/20          (2006.01)
B29C 48/00          (2019.01)
(Continued)

(52) U.S. Cl.
CPC ............ *B32B 27/20* (2013.01); *B29C 48/022* (2019.02); *B29C 48/08* (2019.02); *B29C 48/21* (2019.02); *B32B 7/023* (2019.01); *B32B 27/08*

(2013.01); *B29L 2007/008* (2013.01); *B29L 2009/00* (2013.01); *B32B 2551/00* (2013.01)

(58) Field of Classification Search
None
See application file for complete search history.

(56) References Cited

U.S. PATENT DOCUMENTS

2009/0068380 A1 *   3/2009   Zheng ..................... G02B 1/04
                                                        526/260

FOREIGN PATENT DOCUMENTS

WO          WO-0231540 A1 *   4/2002   ........... G02B 5/0808

* cited by examiner

*Primary Examiner* — Christopher T Schatz
(74) *Attorney, Agent, or Firm* — Greenberg Traurig, LLP

(57) ABSTRACT

An optically anisotropic polymer thin film includes a crystallizable polymer and an additive configured to interact with the polymer (e.g., via π-π interactions) to facilitate chain alignment and, in some examples, create a higher crystalline content within the polymer thin film. The polymer thin film may be characterized by a bimodal molecular weight distribution where the molecular weight of the additive may be less than approximately 50% of the molecular weight of the crystallizable polymer. Example crystallizable polymers include polyethylene naphthalate, polyethylene terephthalate, polybutylene naphthalate, polybutylene terephthalate, as well as derivatives thereof. Example additives, which may occupy up to approximately 10 wt. % of the polymer thin film, include aromatic ester oligomers, aromatic amide oligomers, and polycyclic aromatic hydrocarbons, for example. The optically anisotropic polymer thin film may be characterized by a refractive index greater than approximately 1.7 and an in-plane birefringence greater than approximately 0.2.

17 Claims, 8 Drawing Sheets

Related U.S. Application Data

(60) Provisional application No. 63/143,376, filed on Jan. 29, 2021.

(51) Int. Cl.
| | | |
|---|---|---|
| *B29C 48/08* | (2019.01) | |
| *B29C 48/21* | (2019.01) | |
| *B32B 7/023* | (2019.01) | |
| *B32B 27/08* | (2006.01) | |
| *B29L 7/00* | (2006.01) | |
| *B29L 9/00* | (2006.01) | |

BIREFRINGENT POLYMER HAVING BIMODAL MOLECULAR WEIGHT

CROSS-REFERENCE TO RELATED APPLICATIONS

This application is a Continuation of U.S. application Ser. No. 17/514,298 filed on 29 Oct. 2021, which claims the benefit of priority under 35 U.S.C. § 119(e) of U.S. Provisional Application No. 63/143,376, filed Jan. 29, 2021, the disclosures of each of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 4 depicts exemplary small molecule polycyclic aromatic hydrocarbons and heterocyclic additives that may be used to form a birefringent polymer according to various embodiments.

FIG. 5 shows exemplary diacids that may be used to synthesize an oligomeric additive for forming a birefringent polymer having a bimodal molecular weight distribution according to some embodiments.

FIG. 6 shows exemplary diols that may be used to synthesize an oligomeric additive for forming a birefringent polymer having a bimodal molecular weight distribution according to some embodiments.

FIG. 7 shows exemplary diamines that may be used to synthesize an oligomeric additive for forming a birefringent polymer having a bimodal molecular weight distribution according to some embodiments.

FIG. 8 depicts example monoamines that may be used to synthesize suitable non-reactive capping groups according to some embodiments.

Figure 1:
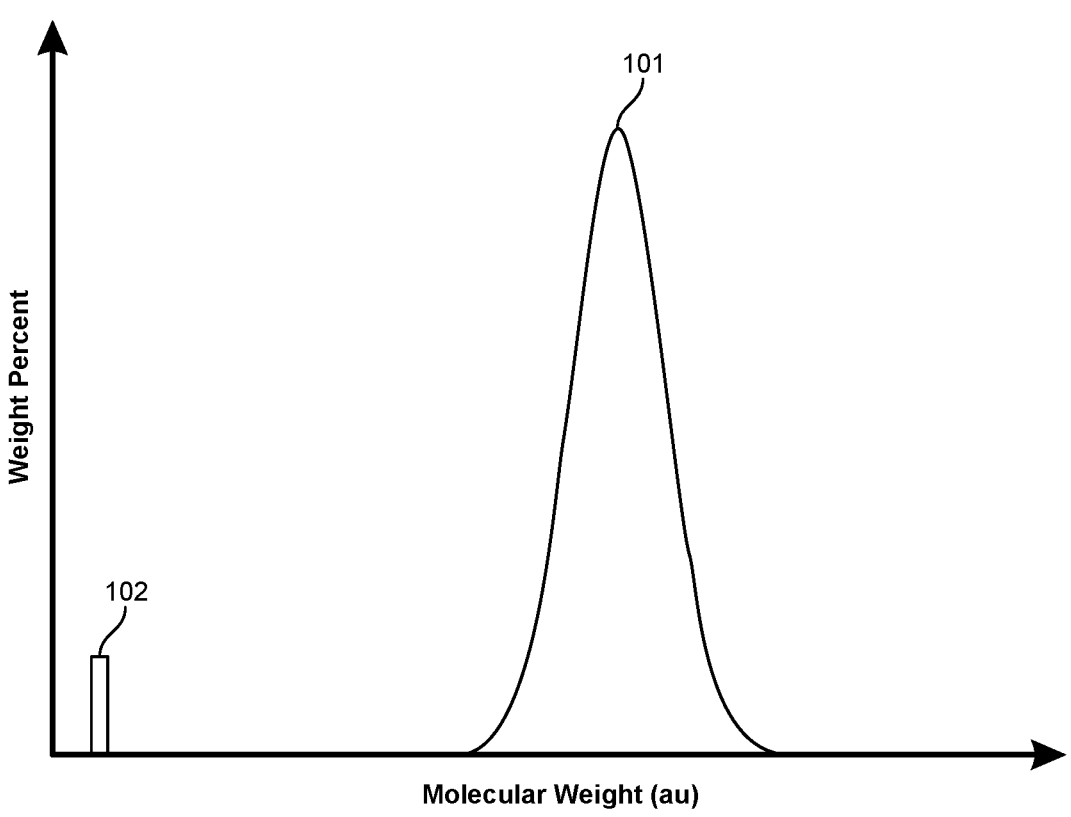
FIG. 1 is a plot showing the bimodal distribution of molecular weight among constituent elements of an example birefringent polymer material according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer thin films exhibiting optical anisotropy may be incorporated into a variety of systems and devices, including birefringent gratings, reflective polarizers, optical compensators and optical retarders for systems using polarized light such as liquid crystal displays (LCDs). Birefringent gratings may be used as optical combiners in augmented reality displays, for example, and as input and output couplers for waveguides and fiber optic systems. Reflective polarizers may be used in many display-related applications, particularly in pancake optical systems and for brightness enhancement within display systems that use polarized light. For orthogonally polarized light, pancake lenses may use reflective polarizers with extremely high contrast ratios for transmitted light, reflected light, or both transmitted and reflected light.

The degree of optical anisotropy achievable through conventional thin film manufacturing processes is typically limited, however, and is often exchanged for competing thin film properties such as flatness, toughness and/or film strength. For example, highly anisotropic polymer thin films often exhibit low strength in one or more in-plane direction, which may challenge manufacturability and limit throughput. Notwithstanding recent developments, it would be advantageous to provide mechanically robust, optically anisotropic polymer thin films that may be incorporated into various optical systems including display systems for artificial reality applications. The instant disclosure is thus directed generally to optically anisotropic polymer thin films and their methods of manufacture, and more specifically to polymer materials having a bimodal molecular weight distribution, which may be used to form optically anisotropic polymer thin films.

Many applications utilize light that propagates along or substantially along a direction normal to the major surface of a polymer thin film, i.e., along the z-axis. Insomuch as the optical efficiency of the polymer thin film may be determined principally by the in-plane birefringence, it may be beneficial to configure the polymer thin film such that $n_x \gg n_y$, where $n_x$ and $n_y$ are mutually orthogonal in-plane refractive indices. In this regard, it will be appreciated that comparative, uniaxially-oriented polymer thin films may be characterized by $n_x > n_y \geq n_z$, where the in-plane birefringence (i.e., $n_x - n_y$) is typically limited to values less than approximately 0.15, e.g., approximately 0.01, approximately 0.05, or approximately 0.1.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

The refractive index of a polymer thin film may be determined by its chemical composition, the chemical structure of the polymer repeat unit, its density and extent of crystallinity, as well as the alignment of the crystals and/or polymer chains. Among these factors, the crystal or polymer chain alignment may dominate. In crystalline or semi-crystalline polymer thin films, the optical anisotropy may be correlated to the degree or extent of crystal orientation, whereas the degree or extent of chain entanglement may create comparable optical anisotropy in amorphous polymer thin films.

An applied stress may be used to create a preferred alignment of crystals or polymer chains within a polymer thin film and induce a corresponding modification of the refractive index along different directions of the film. As disclosed further herein, during processing where a polymer thin film is stretched to induce a preferred alignment of crystals/polymer chains and an attendant modification of the refractive index, Applicants have shown that one approach to forming an optically anisotropic material is to modify the chemical composition of the polymer being stretched. Stretching may include the application of a uniaxial or biaxial stress.

In accordance with particular embodiments, Applicants have developed a polymer thin film manufacturing method for forming an optically uniaxial polymer thin film characterized by in-plane refractive indices ($n_x$ and $n_y$) and a through-thickness refractive index ($n_z$), where $n_x > n_y = n_z$. In particular embodiments, the difference in in-plane refractive indices (i.e., $n_x - n_y$) may be greater than approximately 0.2, and the high in-plane refractive index (i.e., $n_x$) may be greater than approximately 1.7.

The presently disclosed optically anisotropic polymer thin films may be characterized as optical quality polymer thin films and may form, or be incorporated into, an optical element such as a birefringent grating, optical retarder, optical compensator, reflective polarizer, etc. Such optical elements may be used in various display devices, such as virtual reality (VR) and augmented reality (AR) glasses and headsets. The efficiency of these and other optical elements may depend on the degree of in-plane birefringence.

According to various embodiments, an "optical quality polymer thin film" or an "optical thin film" may, in some examples, be characterized by a transmissivity within the visible light spectrum of at least approximately 20%, e.g., 20, 30, 40, 50, 60, 70, 80, 90 or 95%, including ranges between any of the foregoing values, and less than approximately 10% bulk haze, e.g., 0, 1, 2, 4, 6, or 8% bulk haze, including ranges between any of the foregoing values.

In some embodiments, the optical quality polymer thin film may include a single polymer layer. A single layer optical quality polymer thin film may be initially optically isotropic ($n_x = n_y = n_z$) or anisotropic ($n_x > n_y > n_z$). Following stretching, the single layer optical quality polymer thin film may be optically anisotropic, i.e., $n_x > n_y > n$, or $n_x > n_y = n$, or $n_x = n_y > n_z$, or may be characterized by anomalous birefringence, i.e., $n_x > n_z \geq n_y$, and may have a refractive index greater than 1.7, i.e., 1.75, 1.8, 1.85, 1.9, or 1.95 including ranges between any of the foregoing values.

In further embodiments, an optical quality polymer thin film may be incorporated into a multilayer structure, such as the "A" layer in an ABABAB multilayer. Prior to stretching, each A layer may be optically isotropic ($n_x = n_y = n_z$) or anisotropic ($n_x > n_y > n_z$). Following stretching, each A layer may be optically anisotropic, i.e., $n_x > n_y > n_z$, or $n_x > n_y = n_z$, or $n_x = n_y > n_z$, or may be characterized by anomalous birefringence, i.e., $n_x > n_z \geq n_y$, whereas each B layer may remain substantially optically isotropic. In a multilayer polymer thin film, each A layer may have a refractive index greater than 1.7, i.e., 1.75, 1.8, 1.85, 1.9, 1.95 or more, including ranges between any of the foregoing values, and each B layer may have a refractive index less than 1.7, i.e., 1.4, 1.45, 1.5, 1.55, or 1.6, including ranges between any of the foregoing values.

By way of example, a reflective polarizer may include a multilayer architecture of alternating (i.e., primary and secondary) polymer layers. In certain aspects, the primary and secondary polymer layers may be configured to have (a) refractive indices along a first in-plane direction (e.g., along the x-axis) that differ sufficiently to substantially reflect light of a first polarization state, and (b) refractive indices along a second in-plane direction (e.g., along the y-axis) orthogonal to the first in-plane direction that are matched sufficiently to substantially transmit light of a second polarization state. That is, a reflective polarizer may reflect light of a first polarization state and transmit light of a second polarization state orthogonal to the first polarization state. As used herein, "orthogonal" states may, in some examples, refer to complementary states that may or may not be related by a 90° geometry. For instance, "orthogonal" directions used to describe the length, width, and thickness dimensions of a polymer thin film may or may not be precisely orthogonal as a result of non-uniformities in the thin film.

In a multilayer structure, one or more of the polymer layers, i.e., one or more primary polymer layers and/or one or more secondary polymer layers, may be characterized by a directionally-dependent refractive index. By way of example, a primary polymer layer (or a secondary polymer layer) may have a first in-plane refractive index ($n_x$), a second in-plane refractive index ($n_y$) orthogonal to and less than the first in-plane refractive index, and a third refractive index ($n_z$) along a direction orthogonal to a major surface of the primary (or secondary) polymer layer (i.e., orthogonal to both the first in-plane refractive index and the second in-plane refractive index), where the third refractive index is less than the first refractive index and greater than or equal to the second refractive index, i.e., $n_x > n_z \geq n_y$. One or more of the polymer layers, i.e., one or more of the primary polymer layers and/or one or more of the secondary polymer layers, may be characterized as an optical quality polymer thin film.

In a multilayer architecture of alternating polymer layers, each primary polymer layer and each secondary polymer layer may independently have a thickness ranging from approximately 10 nm to approximately 10 mm, e.g., 10, 20, 50, 100, 200, 500, 1000, 2000, 5000, 10000, 20000, 50000, 100000, 200000, 500000, 1000000, 2000000, 5000000, or 10000000 nm, including ranges between any of the foregoing values. A total multilayer stack thickness may range from approximately 1 micrometer to approximately 200 micrometers, e.g., 1, 2, 5, 10, 20, 50, 100, or 200 micrometers, including ranges between any of the foregoing values.

According to some embodiments, the areal dimensions (i.e., length and width) of an optically anisotropic polymer thin film may independently range from approximately 5 cm to approximately 50 cm or more, e.g., 5, 10, 20, 30, 40, or 50 cm, including ranges between any of the foregoing values. Example optically anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

In some embodiments, a multilayer structure may be characterized by a progressive change in the thickness of each individual primary and secondary polymer layer and/or each primary and secondary polymer layer pair. That is, a multilayer architecture may be characterized by an internal thickness gradient where the thickness of individual primary and secondary polymer layers within each successive pair changes continuously throughout the stack.

In various aspects, by way of example, a multilayer stack may include a first pair of primary and secondary polymer layers each having a first thickness, a second pair of primary and secondary polymer layers adjacent to the first pair each having a second thickness that is less than the first thickness, a third pair of primary and secondary polymer layers adjacent to the second pair each having a third thickness that is less than the second thickness, etc. According to certain embodiments, a thickness step for such a multilayer stack suitable for forming a reflective polarizer may be approximately 2 nm to approximately 20 nm, e.g., 2, 5, 10, or 20 nm, including ranges between any of the foregoing values. By way of example, a multilayer stack having a thickness gradient with a 10 nm thickness step may include a first pair of primary and secondary polymer layers each having a thickness of approximately 85 nm, a second pair of primary and secondary polymer layers adjacent to the first pair each having a thickness of approximately 75 nm, a third pair of primary and secondary polymer layers adjacent to the second pair each having a thickness of approximately 65 nm, a fourth pair of primary and secondary polymer layers adjacent to the third pair each having a thickness of approximately 55 nm, and so on.

According to further embodiments, a multilayer stack may include alternating primary and secondary polymer layers where the thickness of each individual layer changes continuously throughout the stack. For instance, a multilayer stack may include a first pair of primary and secondary polymer layers, a second pair of primary and secondary polymer layers adjacent to the first pair, a third pair of primary and secondary polymer layers adjacent to the second pair, etc., where the thickness of the first primary layer is greater than the thickness of the first secondary layer, the thickness of the first secondary layer is greater than the thickness of the second primary layer, the thickness of the second primary layer is greater than the thickness of the second secondary layer, the thickness of the second secondary layer is greater than the thickness of the third primary layer, the thickness of the third primary layer is greater than the thickness of the third secondary layer, and so on.

In certain embodiments, a multilayer structure may include a stack of alternating primary polymer layers and secondary polymer layers where the primary polymer layers may exhibit a higher degree of in-plane optical anisotropy than the secondary polymer layers. For instance, the primary polymer layers may have in-plane refractive indices that differ by at least 0.2 whereas the secondary polymer layers may have in-plane refractive indices that differ by less than 0.2. In such embodiments, by way of example, the primary (more optically anisotropic) polymer layers may include bimodal molecular weight polyethylene naphthalate (PEN), polyethylene terephthalate (PET), or polyethylene isophthalate, and the secondary (less optically anisotropic) polymer layers may include a co-polymer of any two of the foregoing, e.g., a PEN-PET co-polymer, although further compositions are contemplated for the primary polymer layers and the secondary polymer layers. The primary polymer layers may include a low molecular weight additive as disclosed herein.

By way of example, a pancake optical system, such as a pancake lens, may include an optical element having a reflective surface and a reflective polarizer. A pancake lens may be either transmissive or reflective. According to some embodiments, a transmissive system may include a partially transparent mirrored surface and a reflective polarizer configured to reflect one handedness of circularly polarized light and transmit the other handedness of the circularly polarized light. A reflective system, on the other hand, may include a reflective polarizer configured to transmit one polarization of light, a reflector, and a quarter wave plate for converting linearly polarized light to circularly polarized light. Thus, the reflective polarizer may be a circularly polarized element such as, for example, a cholesteric reflective polarizer, or a linearly polarized element that is adapted for use with a quarter wave plate.

In accordance with various embodiments, an optically anisotropic polymer thin film may be formed by applying a desired stress state to a crystallizable polymer thin film. A polymer composition capable of crystallizing may be formed into a single layer using appropriate extrusion and casting operations well known to those skilled in the art. For example, a PEN-based polymer composition may be extruded and oriented as a single layer to form an optically and mechanically anisotropic film. According to further embodiments, a crystallizable polymer may be co-extruded with other polymer materials that are either crystallizable, or those that remain amorphous after orientation to form a multilayer structure. In a further example, PEN may be co-extruded with copolymers of terephthalic and isophthalic acid mixtures polymerized with ethylene glycol.

In single layer and multilayer examples, the thickness of each respective polymer layer may independently range from approximately 5 nm to approximately 1 mm or more for a range of mechanical and optical applications, e.g., 5, 10, 20, 50, 100, 200, 500, or 1000 nm, including ranges between any of the foregoing values. As used herein, the terms "polymer thin film" and "polymer layer" may be used interchangeably. Furthermore, reference to a "polymer thin film" or a "polymer layer" may include reference to a "multilayer polymer thin film" and the like, unless the context clearly indicates otherwise.

In accordance with various embodiments, a polymer composition used to form an optically anisotropic polymer thin film may include a crystallizable polymer and a low molecular weight additive. Without wishing to be bound by theory, one or more low molecular weight additives may interact with polymers (e.g., via 7C-7C interactions) throughout extrusion and stretch processes to facilitate better chain alignment and, in some examples, create a higher crystalline content within the polymer thin film. That is, a polymer composition having a bimodal molecular weight distribution may be extruded to form a thin film, which may be stretched to induce optical anisotropy through crystal and/or chain realignment. Stretching may include the application of a uniaxial stress or a biaxial stress. In some embodiments, the application of an in-plane biaxial stress may be performed simultaneously or sequentially. In some embodiments, the additive may beneficially decrease the draw temperature of the polymer composition during extrusion.

A method of forming an optically anisotropic polymer thin film (e.g., an optical quality polymer thin film) may include pre-mixing and/or co-extruding a crystallizable polymer and an additive having a low molecular weight. The mixture having a bimodal molecular weight distribution may be formed into a single layer using suitable extrusion and casting operations. For instance, the mixture may be extruded and oriented as a single optically and mechanically anisotropic optical quality polymer thin film. According to further embodiments, the mixture may be co-extruded with a second polymer material to form a multilayer optical quality polymer thin film. The second polymer material may include a crystallizable polymer or a polymer material that remains substantially amorphous after extrusion and orientation steps. Such a multilayer may be optically and mechanically anisotropic.

In some embodiments, a polymer thin film having a bimodal molecular weight distribution may be stretched to a larger stretch ratio than comparative polymer thin film (i.e., lacking a low molecular weight additive). In some examples, a stretch ratio may be greater than 5, e.g., 10 or 20. Such a stretched polymer thin film may exhibit optically uniaxial performance, e.g., where $n_x > n_y = n_z$. In further examples, such a stretched polymer thin film may exhibit optically non-uniaxial performance, where $n_x > n_y > n_z$. An oriented polymer thin film having a bimodal molecular weight distribution may have a modulus greater than approximately 2 GPa, e.g., 3 GPa or 5 GPa, including ranges between any of the foregoing values.

Example crystallizable polymers may include one or more of polyethylene naphthalate, polyethylene terephthalate, polyethylene isophthalate, polybutylene terephthalate, polyoxymethylene, aliphatic or semi-aromatic polyamides, ethylene vinyl alcohol, polyvinylidene fluoride, isotactic polypropylene, polyethylene, and the like, as well as combinations, including isomers and co-polymers thereof. Further example polymers may be derived from phthalic acid, azelaic acid, norbornene dicarboxylic acid and other dicarboxylic acids. Suitable carboxylates may be polymerized with glycols including ethylene glycol, propylene glycol, and other glycols and di-hydrogenated organic compounds.

In some embodiments, the crystalline content may include polyethylene naphthalate or polyethylene terephthalate, for example, although further crystalline polymer materials are contemplated, where a crystalline phase in a "crystalline" or "semi-crystalline" polymer thin film may, in some examples, constitute at least approximately 1 wt. % of the polymer thin film. In some embodiments, the crystalline content of the crystallizable polymer thin film may increase during the act of stretching. In some embodiments, stretching may alter the orientation of crystals within a crystallizable polymer thin film without substantially changing the crystalline content.

In some embodiments, the low molecular weight additive may include a small molecule, such as a polycyclic aromatic hydrocarbon or heterocycle. Such a small molecule additive may constitute up to approximately 10 wt. % of the polymer thin film, e.g., approximately 1 wt. %, approximately 2 wt. %, approximately 5 wt. %, or approximately 10 wt. %, including ranges between any of the foregoing values. In some embodiments, the low molecular weight additive may include an oligomer or low molecular weight polyester polymer, such as an aromatic ester oligomer or an aromatic amide oligomer. Such a low molecular weight additive may constitute up to approximately 80 wt. % of the polymer thin film, e.g., approximately 10 wt. %, approximately 20 wt. %, approximately 30 wt. %, approximately 40 wt. %, approximately 50 wt. %, approximately 60 wt. %, approximately 70 wt. %, or approximately 80 wt. %, including ranges between any of the foregoing values.

In some embodiments, the molecular weight of the additive may be less than approximately 70% of the molecular weight of the crystallizable polymer, e.g., less than approximately 70%, less than approximately 60%, less than approximately 50%, less than approximately 40%, less than approximately 30%, less than approximately 20%, less than approximately 10%, or less than approximately 5%, including ranges between any of the foregoing values. Example crystallizable polymers may have a molecular weight ranging from approximately 5000 g/mol to approximately 200, 000 g/mol.

An optically anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (e.g., along the y-direction). As used herein, the relaxation of a polymer thin film may, in certain examples, accompany the absence of an applied stress along a relaxation direction.

According to some embodiments, within an example system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, the stretching rate in the transverse direction and the relaxation rate in the machine direction may be independently and locally controlled. In certain embodiments, large scale production may be enabled, for example, using a roll-to-roll manufacturing platform.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline polymer thin film may be heated to a temperature equal to or greater than its glass transition temperature ($T_g$), e.g., $T_g$, $T_g + 10°$ C., $T_g + 15°$ C., $T_g + 20°$ C., $T_g + 30°$ C., $T_g + 40°$ C., and $T_g + 50°$ C., including ranges between any of the foregoing values, to facilitate deformation of the thin film and the formation and realignment of crystals and/or polymer chains therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, a region of the polymer thin film may be heated to different temperatures, i.e., during and/or subsequent to the application of the tensile stress. In some embodiments, different regions of the polymer thin film may be heated to different temperatures. In certain embodiments, the strain realized in response to the applied tensile stress may be at least approximately 20%, e.g., approximately 20%, approximately 50%, approximately 100%, approximately 200%, approximately 300%, approximately 400%, approximately 500%, approximately 600%, or approximately 700% or more, including ranges between any of the foregoing values.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film.

Following deformation, the crystals or chains may be at least partially aligned with the direction of the applied tensile stress. As such, an optically uniaxial polymer thin film may exhibit a high degree of birefringence, e.g., in-plane birefringence, where $n_x > n_y = n_z$. In some embodiments, the difference $(n_x - n_y)$ may be greater than approximately 0.2, e.g., approximately 0.25, approximately 0.3, or approximately 0.35, including ranges between any of the foregoing values, where $n_x$ may be greater than approximately 1.7, e.g., approximately 1.8, approximately 1.85, approximately 1.87, approximately 1.89, approximately 1.91, approximately 1.93, or approximately 1.95, including ranges between any of the foregoing values.

In accordance with various embodiments, optically anisotropic polymer thin films may include fibrous, amorphous, partially crystalline, or wholly crystalline materials. Such materials may also be mechanically anisotropic, where one or more characteristics including but not limited to compressive strength, tensile strength, shear strength, yield strength, stiffness, hardness, toughness, ductility, machinability, thermal expansion, and creep behavior may be directionally dependent.

The optically anisotropic polymer thin films disclosed herein may be used to form multilayer reflective polarizers that may be implemented in a variety of applications. For instance, a multilayer reflective polarizer may be used to increase the polarized light output by an LED- or OLED-based display grid that includes an emitting array of monochromatic, colored, or IR pixels. In some embodiments, a reflective polarizer thin film may be applied to an emissive pixel array to provide light recycling and increased output for one or more polarization states. Moreover, highly optically anisotropic polymer thin films may decrease pixel blur in such applications.

An example reflective polarizer may be characterized as a multilayer structure having between approximately 2 and approximately 1000 layers of alternating first and second polymers, e.g., 2, 10, 20, 50, 100, 250, 500, 1000 layers, or more, including ranges between any of the foregoing values. The first polymer may form an optically birefringent polymer thin film. In some embodiments, the first polymer may have a bimodal molecular weight distribution whereas the second polymer may have a unimodal molecular weight distribution. Layers of the first polymer may exhibit a difference between a high in-plane refractive index and a low in-plane refractive index each measured at 550 nm of at least approximately 0.2, and a difference between an out of plane refractive index and the low in-plane refractive index each measured at 550 nm of less than approximately 0.1, e.g., less than approximately 0.05, or even less than approximately 0.025.

A reflective polarizer including an optically anisotropic polymer thin film may be thermally stable and have a reflectivity of less than approximately 10%, e.g., less than approximately 5%, less than approximately 2%, or less than approximately 1%, for linearly p-polarized light incident at a 45° angle and oriented along the pass axis of the reflective polarizer. The reflective polarizer may exhibit less than approximately 5% strain (e.g., less than approximately 5% shrinkage, less than approximately 2% shrinkage, less than approximately 1% shrinkage, or less than approximately 0.5% shrinkage) when heated at approximately 95° C. for at least 40 minutes.

Aspects of the present disclosure thus relate to the formation of a single layer optically anisotropic polymer thin film as well as a multilayer polymer thin film (e.g., reflective polarizer) having improved mechanical and optical properties and including one or more optically anisotropic polymer thin films. The improved mechanical properties may include improved dimensional stability and improved compliance in conforming to a compound curved surface. The improved optical properties may include a higher contrast ratio and reduced polarization angle variance when conformed to a compound curved surface.

According to some embodiments, an optically anisotropic polymer thin film may include a crystallizable polymer, and an additive selected from the group consisting of an aromatic ester oligomer, an aromatic ester polymer, an aromatic amide oligomer, an aromatic amide polymer, and a polycyclic aromatic hydrocarbon, where the optically anisotropic polymer thin film has a refractive index greater than approximately 1.7 and an in-plane birefringence greater than approximately 0.2.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-10, a detailed description of oligomer, polymer, and other compositions suitable for forming optically anisotropic polymer thin films. The discussion associated with FIGS. 1-8 relates to example polymer materials having a bimodal molecular weight distribution. The discussion associated with FIGS. 9 and 10 relates to exemplary virtual reality and augmented reality devices that may include one or more optically anisotropic polymer materials.

Figure 2:
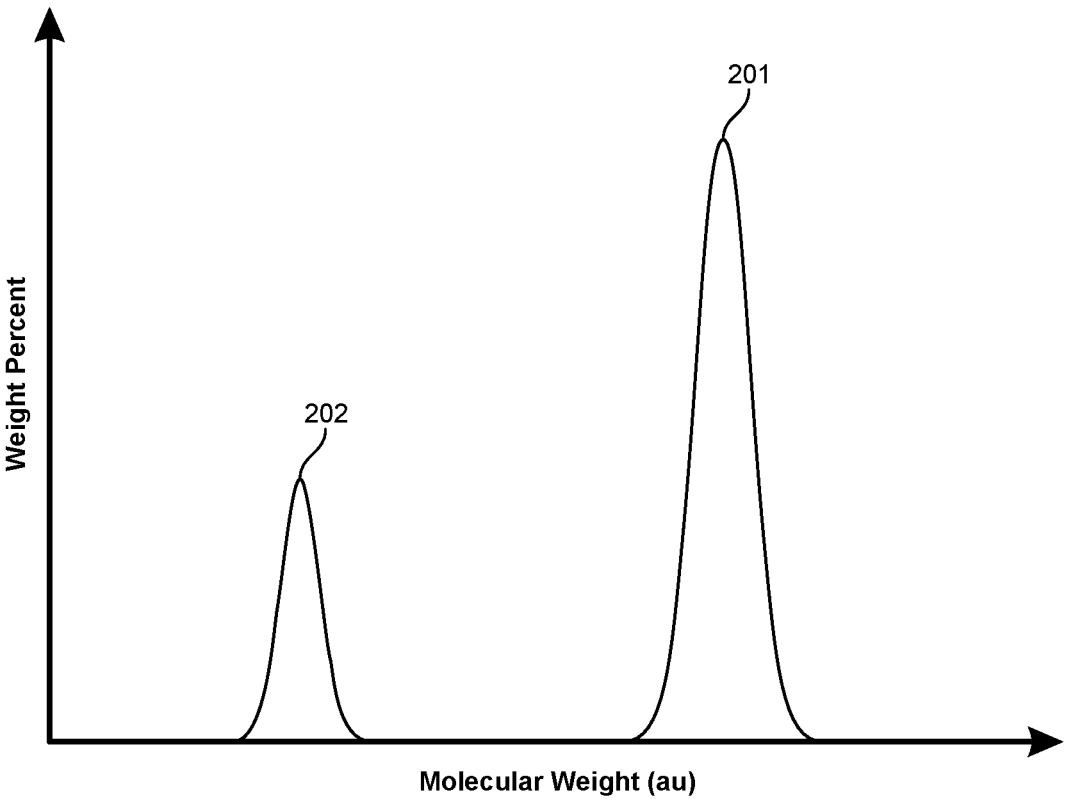
FIG. 2 is a plot showing the bimodal distribution of molecular weight among constituent elements of an example birefringent polymer material according to further embodiments.
Figure 3:
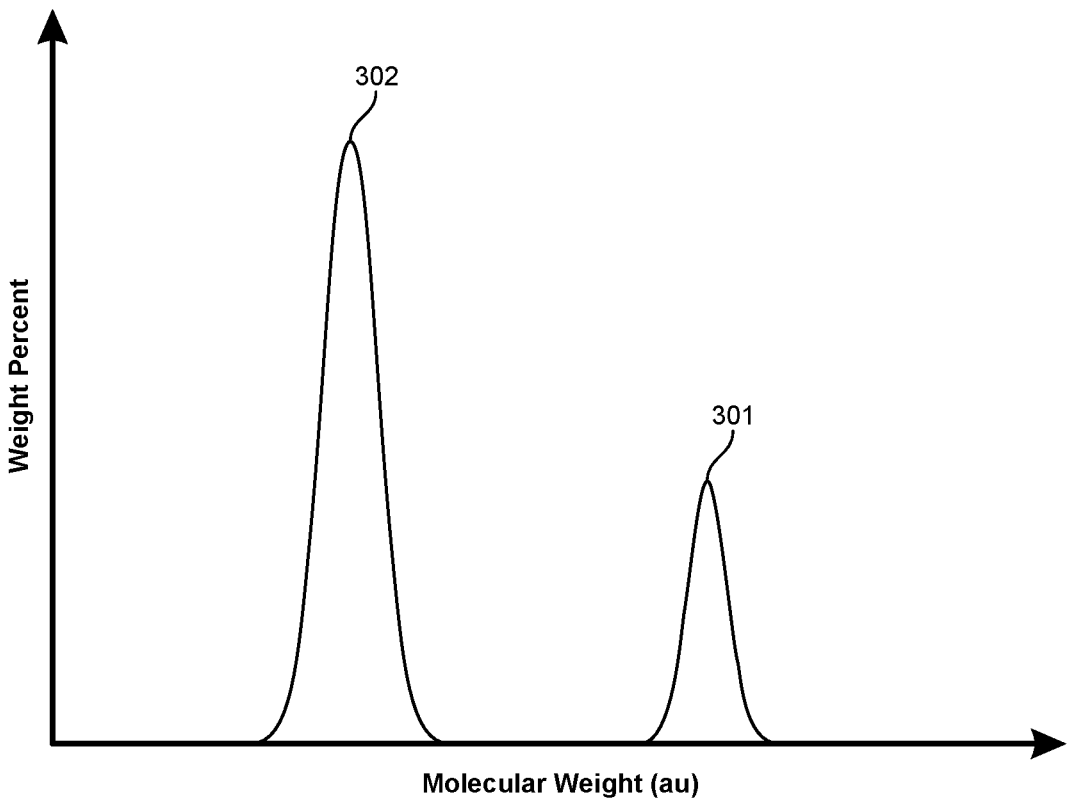
FIG. 3 is a plot showing the bimodal distribution of molecular weight among constituent elements of an example birefringent polymer material according to still further embodiments.
Figure 4:
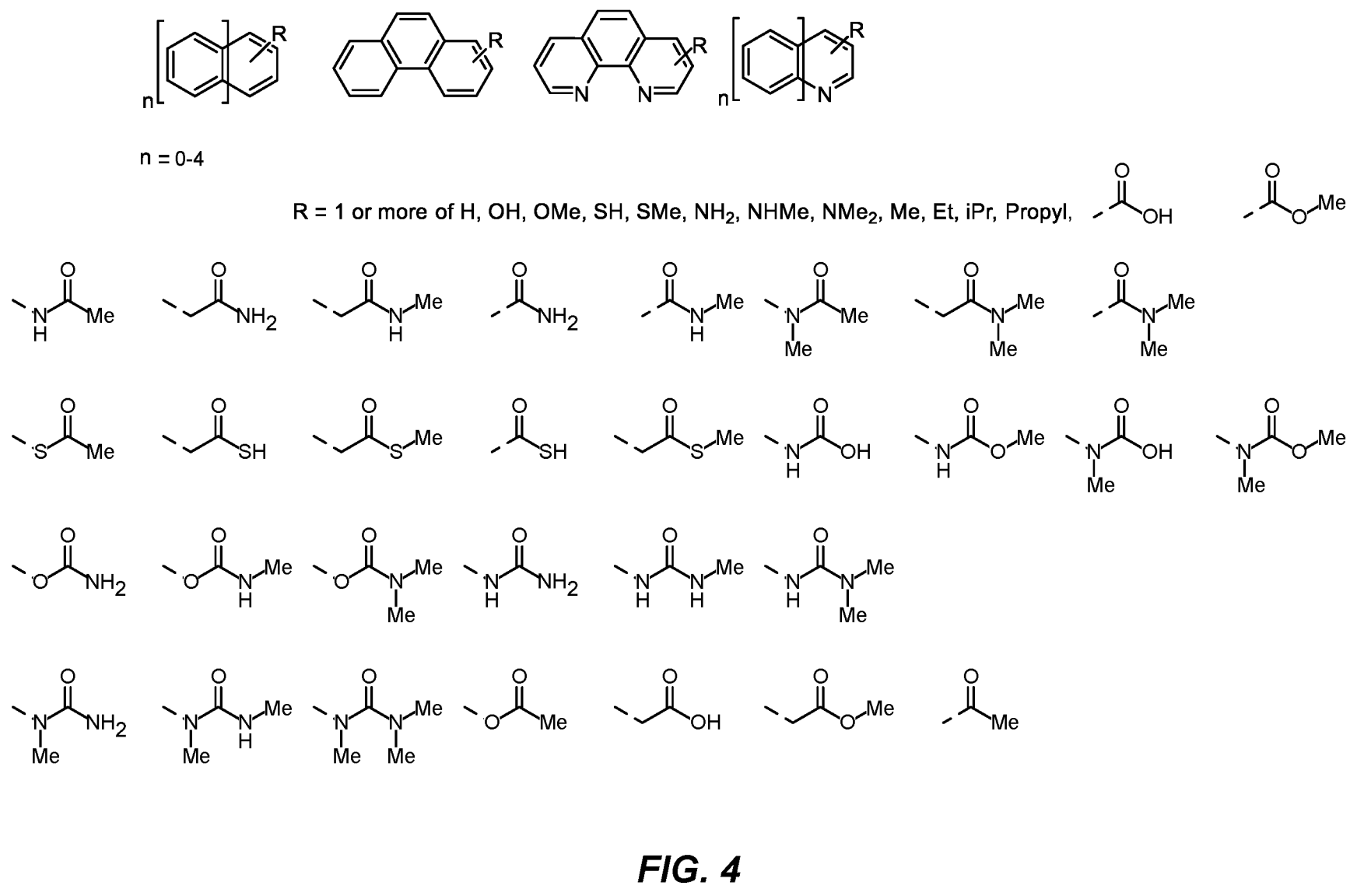

Referring to FIG. 1, shown schematically is a polymer composition having a bimodal molecular weight distribution that includes a crystallizable polymer 101 and a low molecular weight additive 102. The additive may include an aromatic ester oligomer, an aromatic ester polymer, an aromatic amide oligomer, an aromatic amide polymer, or a small molecule polycyclic aromatic hydrocarbon (PAH) and heterocycles, including benzene or one or more acenes, such as anthracene, tetracene, and pentacene, phenanthroline, and their derivatives, for example. Referring to FIG. 2, shown schematically is a polymer composition having a bimodal molecular weight distribution that includes a crystallizable polymer 201 and a low molecular weight additive 202 where the amount of crystallizable polymer 201 is greater than the amount of low molecular weight additive 202. Referring to FIG. 3, shown schematically is a polymer composition having a bimodal molecular weight distribution that includes a crystallizable polymer 301 and a low molecular weight additive 302 where the amount of low molecular weight additive 302 is greater than the amount of the crystallizable polymer 301. Example small molecule polycyclic aromatic hydrocarbons are shown in FIG. 4.

Suitable aromatic oligomers may have an intrinsic viscosity in the range of approximately 0.1 dL/g to approximately 0.6 dL/g, e.g., 0.1, 0.2, 0.3, 0.4, 0.5, or 0.6 dL/g, including ranges between any of the foregoing values.

Example oligomers may include esters, such as dimethyl-2,6-naphthalene dicarboxylate or dimethyl terephthalate. Aromatic ester oligomers may be synthesized by a condensation reaction between a diacid and a diol.

Figure 5:
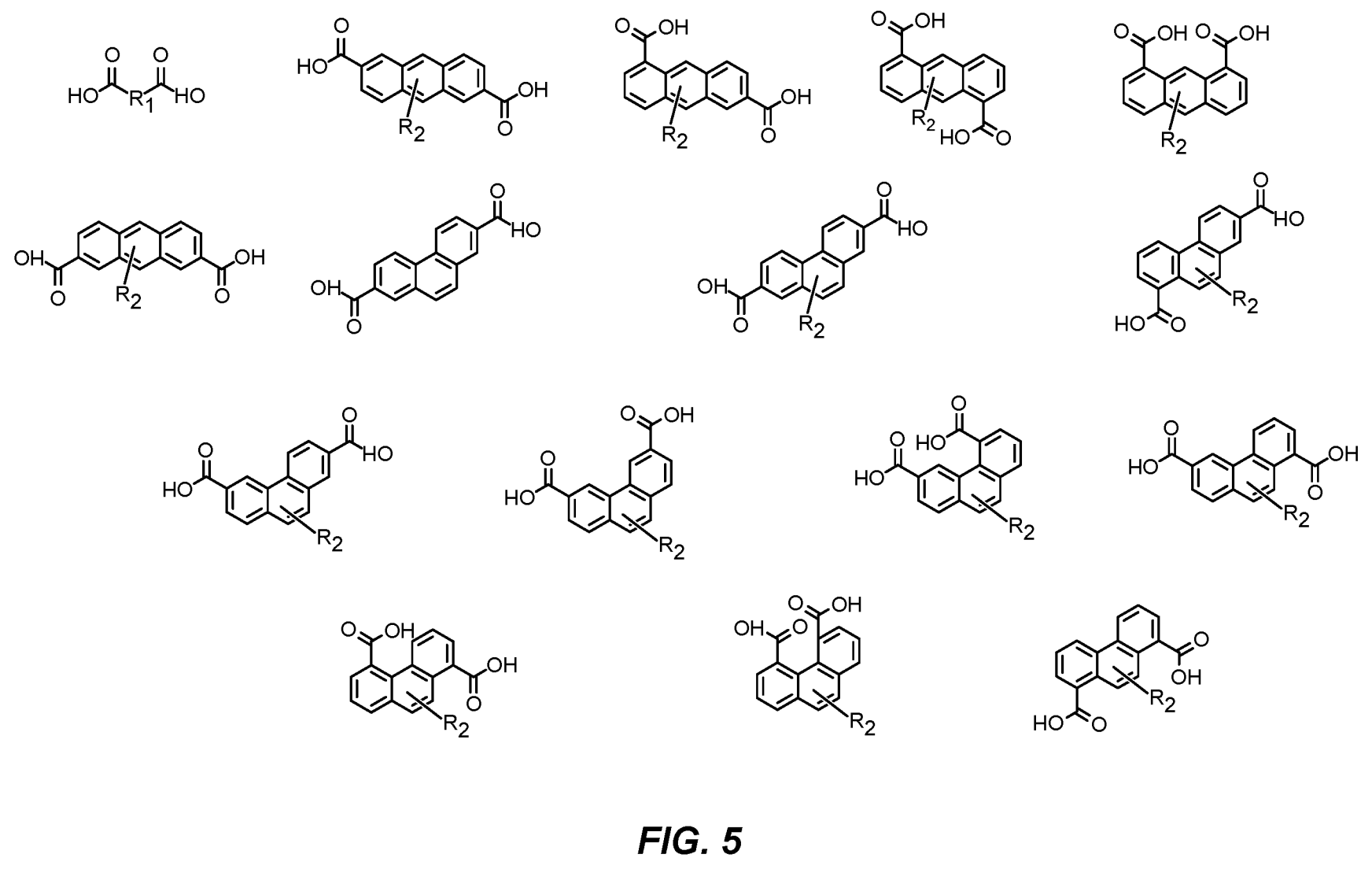

Example diacids include sebacic acid, dimer fatty acid, as well as one or more of the various diacids shown in FIG. 5, where R1 may include $(CH_2)_n$ ($2<n<15$) and R2 may include $CH_3$, ethyl, $CH_3$—$(CH_2)_n$, oxymethylene, ethoxy, isopropoxide, H, F, Cl, Br, I, phenyl, isopropyl, t-butyl, sec-butyl, S-methyl, aldehyde, amide, $NMe_2$, $C_2H_2$, and the like, where $n>1$.

Figures 6, 7, 8:
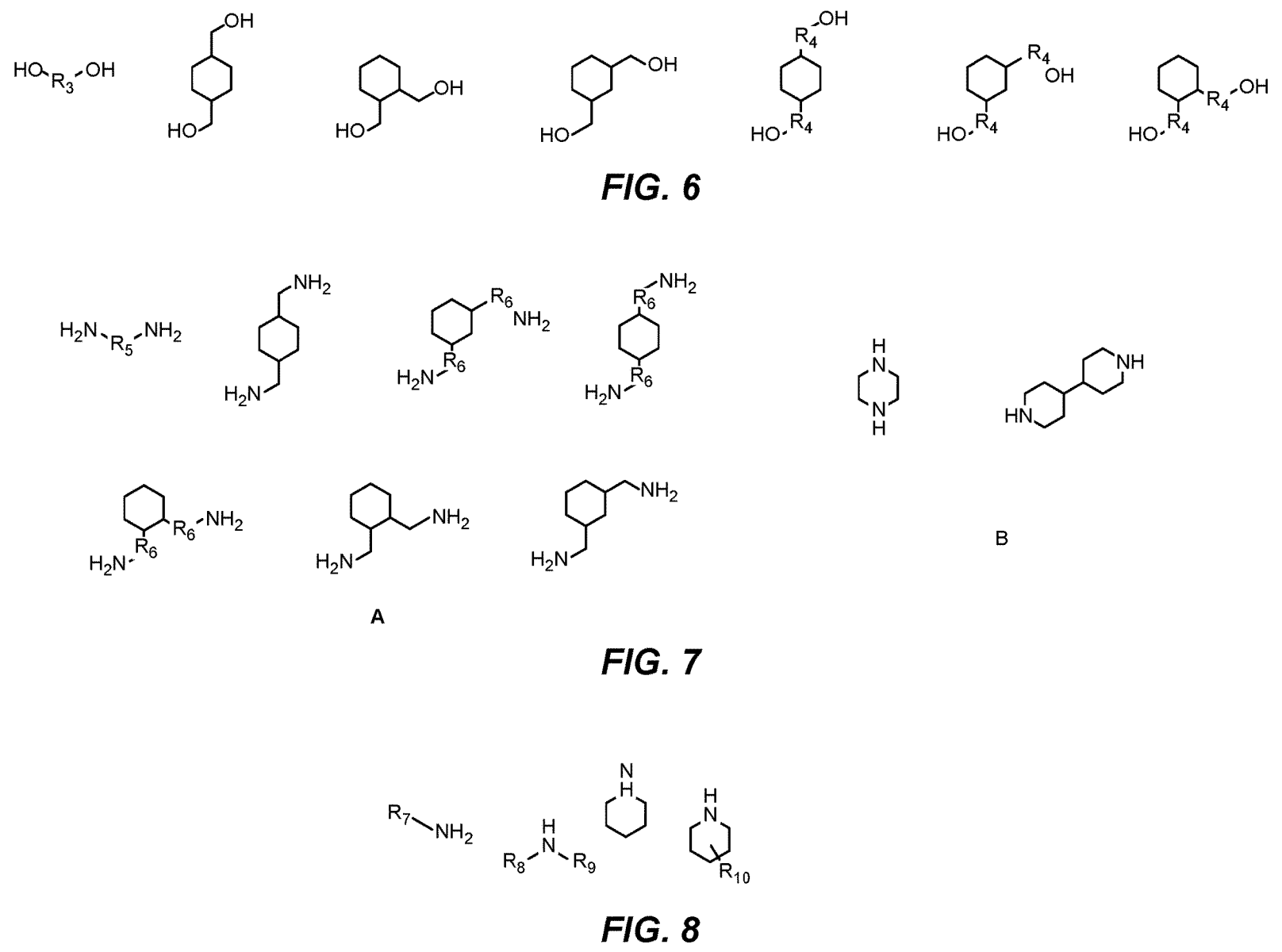

Example diols include ethylene glycol, neopentyl glycol, cyclohexane dimethanol, as well as the various diols shown in FIG. 6, where R3 may include $(CH_2)_n$ ($2<n<15$) and R4 may include $(CH_2)_n$ ($1<n<8$).

In some embodiments, to inhibit or prevent transesterification reactions between the oligomer and the crystallizable polymer during compounding or extrusion, the oligomer may be an aromatic amide oligomer that may be synthesized by a condensation reaction between a diacid and a diamine. Example diacids are shown in FIG. 5. Referring to FIG. 7, example diamines include primary diamines, such as ethylene diamine, dimer diamine, polyether amine, as well as the various primary diamines shown in FIG. 7A, where R5 may include $(CH_2)_n$ ($2<n<15$) and R6 may include $(CH_2)_n$ ($1<n<8$), and secondary diamines, as shown in FIG. 7B.

According to certain embodiments, an amide oligomer may be capped with a non-reactive group. A non-reactive capping group may inhibit or prevent undesired reactions between the oligomer and the crystallizable polymer. Example non-reactive capping groups may be synthesized by reacting a diacid, a diamine, and a monoamine at a proper stoichiometric ratio.

Example diacids and example diamines are shown in FIG. 5 and in FIG. 7, respectively. Example monoamines are shown in FIG. 8, where R7, R8, and R9 may include a hydrocarbon chain, and R10 may include $CH_3$, ethyl, $CH_3$—$(CH_2)_n$, oxymethylene, ethoxy, isopropoxide, H, F, Cl, Br, I, phenyl, isopropyl, t-butyl, sec-butyl, S-methyl, aldehyde, amide, $NMe_2$, $C_2H_2$, and the like, where $n>1$.

As disclosed herein, a high refractive index ($n>1.7$), optically anisotropic polymer thin film includes a crystallizable polymer and a low molecular weight additive. The crystallizable polymer may include polyethylene naphthalate, polyethylene terephthalate, polybutylene naphthalate, polybutylene terephthalate, and the like, as well as derivatives thereof, and the low molecular weight additive, which may constitute up to approximately 10 wt. % of the polymer thin film, may include an aromatic ester oligomer or polymer, or an aromatic amide oligomer or polymer, for example. The molecular weight of the additive may be less than 50% of the molecular weight of the crystallizable polymer.

In certain embodiments, the oligomeric additive(s) may be terminated by a non-reactive moiety (e.g., a methyl, ethyl, ethoxy, amide, or aldehyde group, for instance) and may interact with polymer chains during extrusion and stretch processes to facilitate improved chain alignment and a greater crystalline content in the polymer thin film. In some embodiments, the optically anisotropic polymer thin film may additionally include an inhibitor (i.e., a transesterification inhibitor such as an organo-phosphite, including bis(2, 4-di-t-butylphenyl)pentaerythritol diphosphate, or its derivatives). The use of an inhibitor and/or terminated oligomers may beneficially inhibit transesterification, hydrolysis, and/or condensation reactions between oligomers and polymers during compounding or extrusion.

A polymer composition having a bimodal molecular weight may be formed into a single layer using extrusion and casting operations. Alternatively, a polymer composition having a bimodal molecular weight may be co-extruded with other polymers to form a multilayer polymer thin film. The application of a uniaxial or biaxial stress to an extruded single or multilayer thin film may be used to align polymer chains and/or re-orient crystals to induce optical and mechanical anisotropy therein. Such thin films may be used to fabricate birefringent substrates, high Poisson's ratio thin films, reflective polarizers, birefringent mirrors, and the like, and may be incorporated into high contrast refractive polarizers, birefringent surface relief gratings, AR/VR combiners, or used to provide display brightness enhancement.

EXAMPLE EMBODIMENTS

Example 1: An optically anisotropic polymer thin film includes a crystallizable polymer and an additive selected from an aromatic ester oligomer, an aromatic ester polymer, an aromatic amide oligomer, an aromatic amide polymer, and a polycyclic aromatic hydrocarbon, where the optically anisotropic polymer thin film has a refractive index greater than approximately 1.7 and an in-plane birefringence greater than approximately 0.2.

Example 2: The optically anisotropic polymer thin film of Example 1, where the crystallizable polymer is selected from polyethylene naphthalate, polyethylene terephthalate, polybutylene naphthalate, polybutylene terephthalate, and derivatives thereof.

Example 3: The optically anisotropic polymer thin film of any of Examples 1 and 2, where the aromatic ester oligomer is selected from polyethylene naphthalate, polyethylene terephthalate, polybutylene naphthalate, polybutylene terephthalate, and derivatives thereof.

Example 4: The optically anisotropic polymer thin film of any of Examples 1-3, wherein the aromatic amide oligomer is terminated by a non-reactive group.

Example 5: The optically anisotropic polymer thin film of any of Examples 1-4, where the additive includes an acene selected from anthracene, tetracene, pentacene, and derivatives thereof.

Example 6: The optically anisotropic polymer thin film of any of Examples 1-5, where the additive constitutes less than approximately 80 wt. % of the polymer thin film.

Example 7: The optically anisotropic polymer thin film of any of Examples 1-6, where a molecular weight of the additive is less than approximately 70% of a molecular weight of the crystallizable polymer.

Example 8: The optically anisotropic polymer thin film of any of Examples 1-7, further including a transesterification inhibitor.

Example 9: The optically anisotropic polymer thin film of any of Examples 1-8, where the optically anisotropic polymer thin film includes an optical quality polymer thin film.

Example 10: A multilayer polymer thin film including the optically anisotropic polymer thin film of any of Examples 1-9.

Example 11: A multilayer polymer thin film includes alternating layers of a first polymer and a second polymer, where the first polymer layers have a refractive index greater than 1.7, the second polymer layers have a refractive index less than 1.7, and the first polymer layers include a crystallizable polymer and an additive selected from an aromatic ester oligomer, an aromatic ester polymer, an aromatic amide oligomer, an aromatic amide polymer, and a polycyclic aromatic hydrocarbon.

Example 12: The multilayer polymer thin film of Example 11, where the first polymer layers have an in-plane birefringence greater than approximately 0.2.

Example 13: The multilayer polymer thin film of any of Examples 11 and 12, where the additive constitutes less than approximately 80 wt. % of the polymer thin film.

Example 14: The multilayer polymer thin film of any of Examples 11-13, where a molecular weight of the additive is less than approximately 70% of a molecular weight of the crystallizable polymer.

Example 15: The multilayer polymer thin film of any of Examples 11-14, where the multilayer polymer thin film includes an optical quality polymer thin film.

Example 16: A method includes forming a first polymer thin film including a crystallizable polymer and an additive selected from an aromatic ester oligomer, an aromatic ester polymer, an aromatic amide oligomer, an aromatic amide polymer, and a polycyclic aromatic hydrocarbon, and producing an in-plane strain in the first polymer thin film along a first direction in an amount sufficient to re-orient crystals or align polymer chains within the first polymer thin film and form an optically anisotropic polymer thin film.

Example 17: The method of Example 16, where forming the polymer thin film includes extruding a mixture containing the crystallizable polymer and the additive.

Example 18: The method of any of Examples 16 and 17, where producing the in-plane strain includes applying a uniaxial stress to the polymer thin film.

Example 19: The method of any of Examples 16 and 17, where producing the in-plane strain includes applying a biaxial stress to the polymer thin film.

Example 20: The method of any of Examples 16-19, further including forming a second polymer thin film directly over the first polymer thin film prior to producing the in-plane strain.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
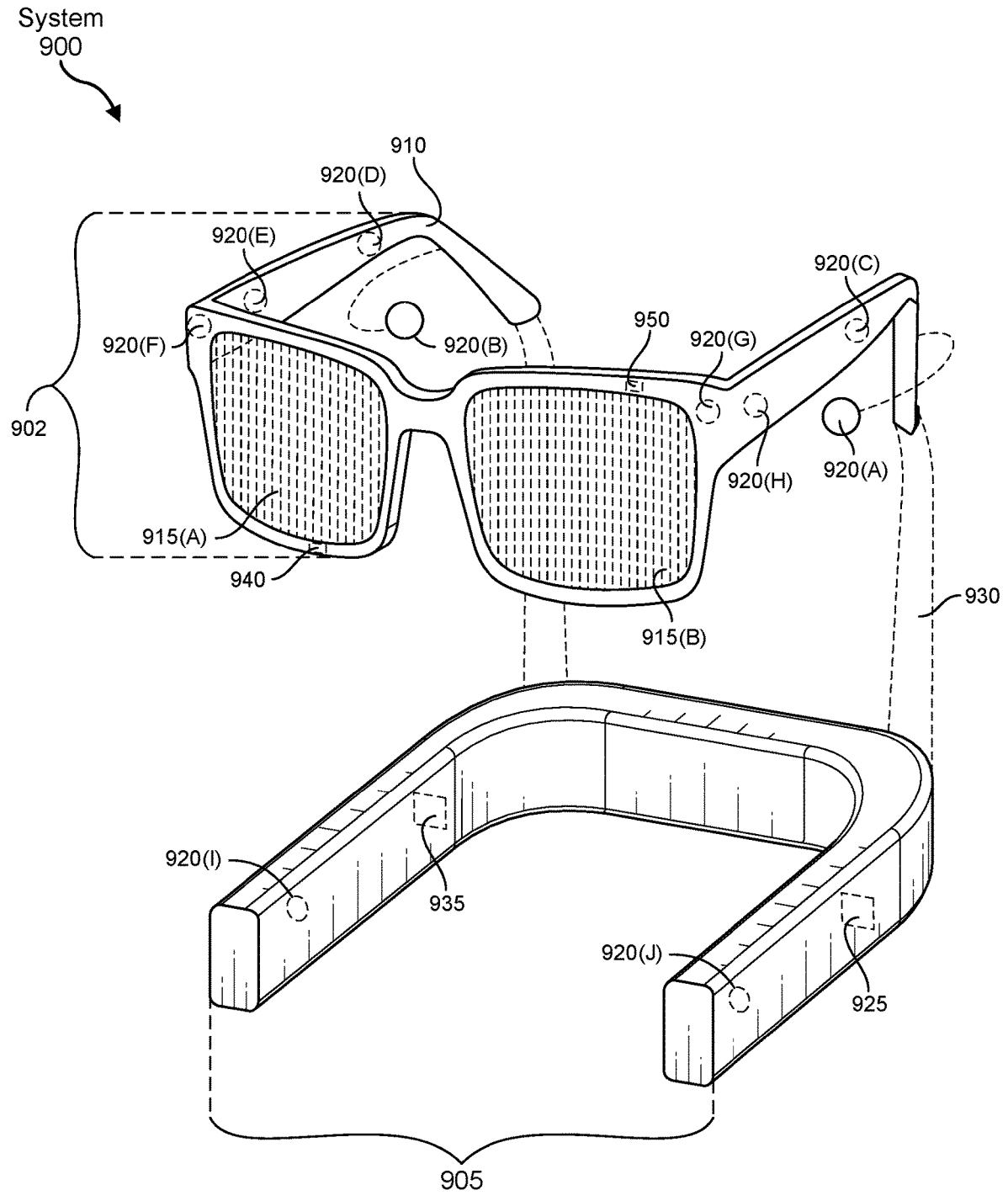
FIG. 9 is an illustration of exemplary augmented-reality glasses that may be used in connection with embodiments of this disclosure.
Figure 10:
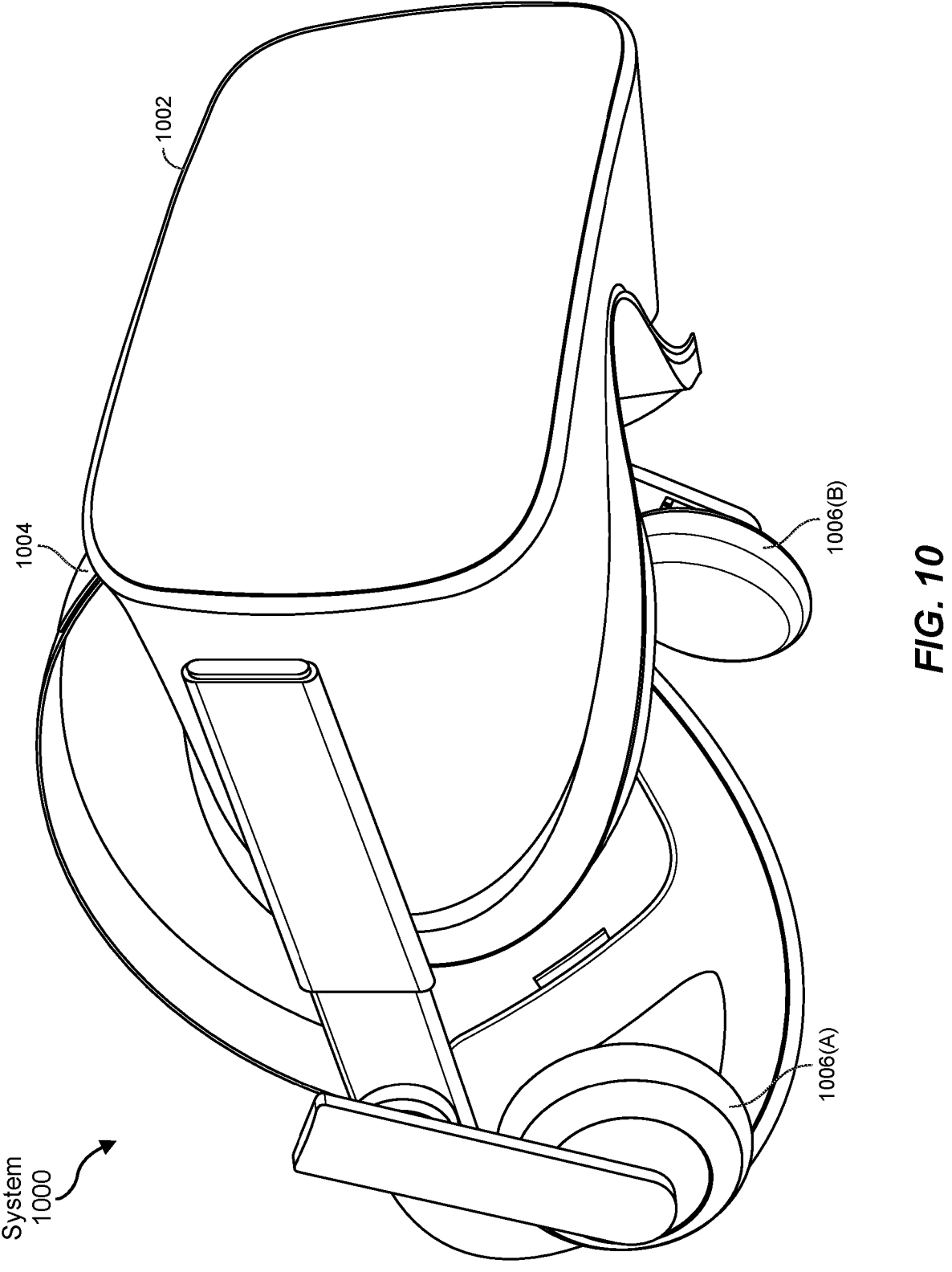
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920 (G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a crystallizable polymer that comprises or includes polyethylene naphthalate include embodiments where a crystallizable polymer consists essentially of polyethylene naphthalate and embodiments where a crystallizable polymer consists of polyethylene naphthalate.

What is claimed is:

1. A method comprising:
   forming a first polymer layer comprising a crystallizable polymer and an additive selected from the group consisting of an aromatic ester oligomer, an aromatic ester polymer, an aromatic amide oligomer, an aromatic amide polymer, and a polycyclic aromatic hydrocarbon, the first polymer layer having a bimodal molecular weight distribution;
   forming a second polymer layer directly over the first polymer layer, the second polymer layer having a unimodal molecular weight distribution; and producing an in-plane strain in the first polymer layer along a first direction in an amount sufficient to reorient crystals or align polymer chains within the first polymer layer and form an optically anisotropic polymer layer.

2. The method of claim 1, wherein forming the first polymer layer comprises extruding a mixture containing the crystallizable polymer and the additive.

3. The method of claim 1, wherein producing the in-plane strain comprises applying a uniaxial stress to the first polymer layer.

4. The method of claim 1, wherein producing the in-plane strain comprises applying a biaxial stress to the first polymer layer.

5. The method of claim 1, wherein the crystallizable polymer is selected from the group consisting of polyethylene naphthalate, polyethylene terephthalate, polybutylene naphthalate, polybutylene terephthalate, and derivatives thereof.

6. The method of claim 1, wherein the aromatic ester oligomer is selected from the group consisting of polyethylene naphthalate, polyethylene terephthalate, polybutylene naphthalate, polybutylene terephthalate, and derivatives thereof.

7. The method of claim 1, wherein the aromatic amide oligomer is terminated by a non-reactive group.

8. The method of claim 1, wherein the additive comprises an acene selected from the group consisting of anthracene, tetracene, pentacene, and derivatives thereof.

9. The method of claim 1, wherein the additive comprises less than approximately 80 wt. % of the first polymer layer.

10. The method of claim 1, wherein a molecular weight of the additive is less than approximately 70% of a molecular weight of the crystallizable polymer.

11. The method of claim 1, wherein the optically anisotropic polymer layer has a refractive index greater than approximately 1.7 and an in-plane birefringence greater than approximately 0.2.

12. The method of claim 1, wherein the optically anisotropic polymer layer has a transmissivity within a visible light spectrum of at least approximately 20% and less than approximately 10% bulk haze.

13. A method comprising:
   forming a first polymer layer comprising a crystallizable polymer and an additive selected from the group consisting of an aromatic ester oligomer, an aromatic ester polymer, an aromatic amide oligomer, an aromatic amide polymer, and a polycyclic aromatic hydrocarbon, the first polymer layer having a bimodal molecular weight distribution;
   forming a second polymer layer directly over the first polymer layer, the second polymer layer having a unimodal molecular weight distribution; and
   producing an in-plane strain in the first polymer layer along a first direction in an amount sufficient to reorient crystals or align polymer chains within the first polymer layer and form an optically anisotropic polymer layer, wherein the optically anisotropic polymer layer has a transmissivity within a visible light spectrum of at least approximately 20%, a refractive index greater than approximately 1.7, and an in-plane birefringence greater than approximately 0.2.

14. The method of claim 1, wherein the second polymer layer comprises an amorphous polymer.

15. The method of claim 1, wherein the second polymer layer comprises an amorphous crystallizable polymer.

16. The method of claim 1, further comprising co-extruding the second polymer layer and the first polymer layer to form a multilayer polymer thin film.

17. The method of claim 16, wherein the multilayer polymer thin film comprises alternating layers of the first polymer layer and the second polymer layer.

* * * * *